UNITED STATES PATENT OFFICE.

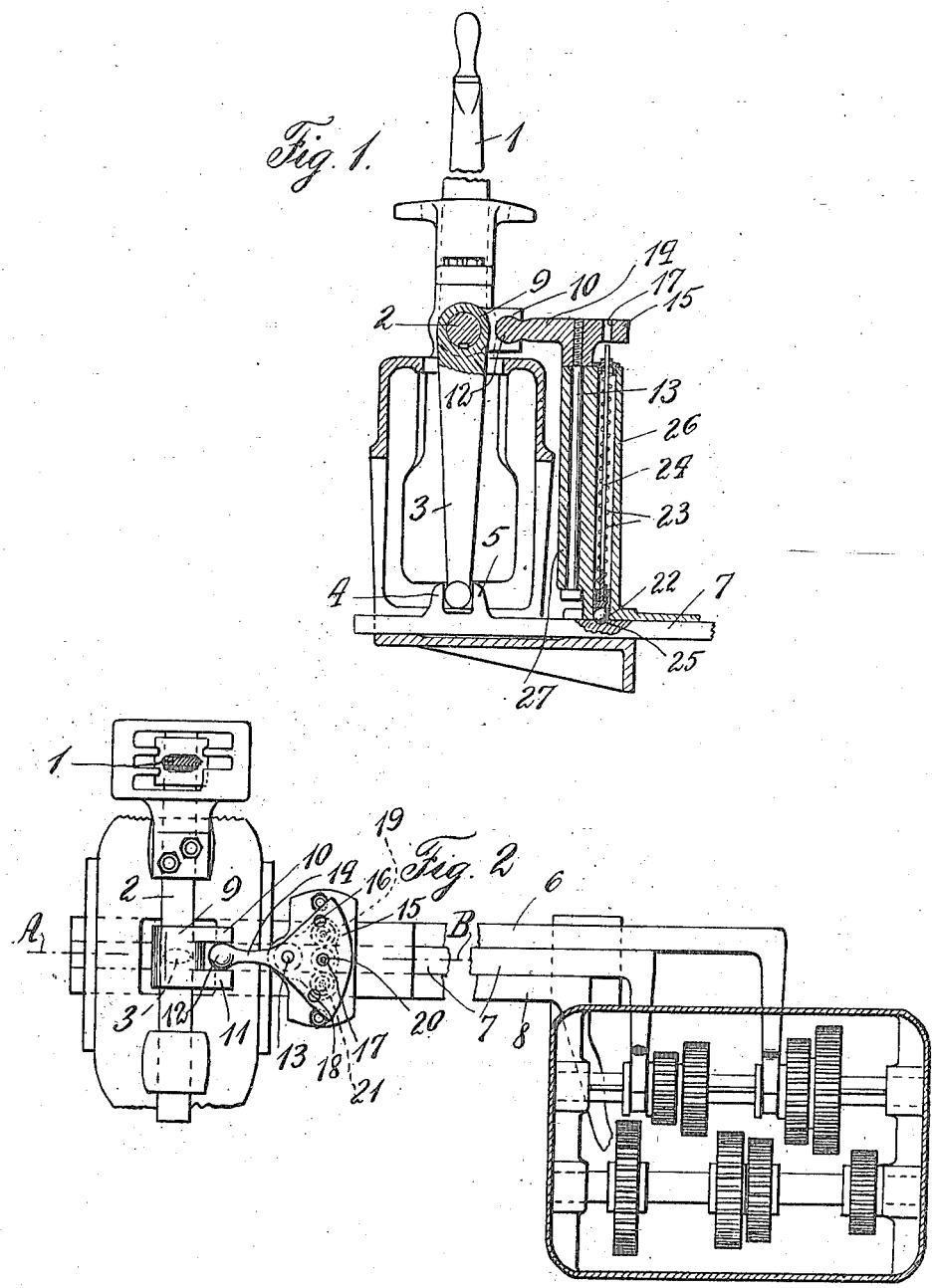

GUSTAV SCHLATTER, OF ARBON, SWITZERLAND, ASSIGNOR TO THE FIRM OF ADOLPH SAURER, OF ARBON, SWITZERLAND.

LOCKING DEVICE FOR CHANGE-SPEED GEARS.

1,220,790.   Specification of Letters Patent.   Patented Mar. 27, 1917.

Application filed December 31, 1915. Serial No. 69,599.

*To all whom it may concern:*

Be it known that I, GUSTAV SCHLATTER, engineer, a citizen of the Swiss Republic, and resident of Arbon, Switzerland, have invented a certain new and useful Locking Device for Change-Speed Gears, of which the following is a specification.

This invention relates to a locking device for change speed gears of the "gate" type. In this type, the change-speed lever is connected with a shifting lever or coupling arm which in its turn may be brought into engagement with a number of shifting rods to effect the changes of speed. The change-speed lever is adapted to be turned about its axis and also to be moved laterally, that is, lengthwise of said axis. In such gears, it is old to provide stops for preventing accidental movement of the shifting rods and connect with the change-speed lever a locking device which, when the lever is moved axially, releases only the stop of the shifting rod which it is desired to operate.

In the locking devices of this kind constructed heretofore, the locking member was a slide and rigidly connected to the change-speed lever in the axial movement of which it took part. This form of locking member has serious drawbacks. It must have comparatively long guides in order to keep it in line and to prevent jamming so that it will work smoothly, but there is generally no room for such long guides, and in any case a slide so guided has great frictional resistance. This is the more inconvenient as moving the change speed lever axially requires more power than turning it on its axis, and so it should be avoided to cause an additional resistance to such movement.

The present invention overcomes these drawbacks by providing a locking member which instead of sliding, only swings over the stops of the shifting rods and, on the change-speed lever being moved axially, releases only the stop of the shifting rod which it is desired to operate. This not only affords an easy movement of the locking member but also the possibility of providing a fairly long bearing for its pivot and so increasing its reliability. There will always be room for a bearing of the desired length.

Reference is to be had to the accompanying drawing in which an example of the new locking device is shown.

Figure 1 is an elevation, partly in section on line A—B of Fig. 2, and Fig. 2 is a plan view, also partly in section.

The change-speed lever 1 is, in the usual manner, adapted to be turned and to be moved laterally, that is, lengthwise of the axis of its fulcrum rod 2. The shifting lever or coupling arm 3 may engage projections 4 and 5 on each shifting rod 6, 7 and 8. This coupling arm or speed-changing shifting lever 3 is held to move in unison with the lever or manually-operated controller 1, and this may be accomplished by securing both the lever 1 and the lever 3 rigidly to the rod 2, and mounting the latter so that it may both slide lengthwise or axially and also rock in its bearings. A bush 9 is arranged to move in unison with the levers 1 and 3, say by securing the bush rigidly to the rod 2 when the latter, as just set forth, is constructed as a sliding rock shaft with the levers 1 and 3 secured to it rigidly. The said bush is provided with two projections 10 and 11 engaging one end 12 of a lever 14 turning on a pivot 13. The other end of this lever is a plate 15 provided with holes 16, 17 and 18 and forms the locking member for the stops of the shifting rods.

The shifting rods 6, 7 and 8 are in the usual manner connected with stops 19, 20 and 21, each of which has a ball 22 resting in a recess 25 of the corresponding shifting rod, and a pin 24 formed into a piston at its lower end and pressed down by a spring 23. All three stops are arranged in a block 26 which also forms a bearing 27 for the pivot 13 of lever 14. This bearing can be made comparatively long because it is in close vicinity to the stops the bores for which must obviously be rather long.

The holes 16, 17 and 18 are so arranged in the locking plate 15 that, when the change-speed lever 1, and with it sleeve 9, is moved laterally, that is lengthwise of the axis of rod 2, thereby turning lever 14, one of these holes is caused to register with the stop of the shifting rod which it is desired to operate, while the other two stops are prevented from upward movement by the solid part of locking plate 15 so that they are unable to release the corresponding shifting rods. In the position of parts illustrated, the shifting lever 3 is between the projections 4 and 5 on shifting rod 7, and hole 17 is in line with the stop 20 of this shifting rod. Consequently, this shifting rod is free to move when lever 1 is turned on its fulcrum rod 2, forcing the ball 22 of the shifting rod 7 out of its recess 25 against the action of spring 23. At the same time, pin 24 enters the hole 17 above it. It will be observed that the axes of the stops 19, 20, 21, and the direction in which said stops move or slide, are vertical, and perpendicular to the plane in which the locking member 15 is adapted to swing.

I claim:

1. A speed-changing gear comprising shifting rods, stops for holding said rods against accidental movement, a speed-changing shifting lever movable laterally to bring it into operative relation to one or the other of said shifting rods, a swinging locking member operatively connected with said lever and arranged to lock said stops selectively, the axes of said stops being at right angles to the plane in which said locking member is adapted to swing.

2. A speed-changing gear comprising shifting rods, stops for holding said rods against accidental movement, a speed-changing shifting lever movable laterally to bring it into operative relation to one or the other of said shifting rods, a swinging locking member operatively connected with said lever and arranged to swing to lock the stops of those shifting rods which at the time are not operatively connected with the speed-changing lever, while releasing the stop of the shifting rod temporarily connected with said lever.

3. A speed-changing gear comprising shifting rods, stops for holding said rods against accidental movement, a speed-changing shifting lever movable laterally to bring it into operative relation to one or the other of said shifting rods, an independently pivoted member operatively connected with the speed-changing lever and adapted to be swung on its pivot by the lateral shifting of said lever, to lock said stops selectively.

In testimony whereof, I have signed this specification.

GUSTAV SCHLATTER.